(12) United States Patent
Cornelissen et al.

(10) Patent No.: US 6,840,646 B2
(45) Date of Patent: Jan. 11, 2005

(54) ILLUMINATION SYSTEM AND DISPLAY DEVICE

(75) Inventors: Hugo Johan Cornelissen, Eindhoven (NL); Horst Greiner, Aachen (DE); John Alfred Clarke, Carshalton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/077,060

(22) Filed: Feb. 15, 2002

(65) Prior Publication Data

US 2002/0126478 A1 Sep. 12, 2002

(30) Foreign Application Priority Data

Feb. 19, 2001 (EP) .............................................. 01301413

(51) Int. Cl.⁷ ................................ F21V 7/04; F21V 9/16
(52) U.S. Cl. ..................... 362/31; 362/228; 362/230; 362/295
(58) Field of Search ........................... 362/31, 228, 230, 362/231, 263, 295, 561, 583; 349/65, 68, 70; 40/544–547

(56) References Cited

U.S. PATENT DOCUMENTS

| | | | | |
|---|---|---|---|---|
| 4,045,664 A | * | 8/1977 | Vrenken et al. | ............ 362/230 |
| 4,956,751 A | * | 9/1990 | Kano | ......................... 362/231 |
| 5,375,043 A | | 12/1994 | Tokunaga | ..................... 362/31 |
| 5,685,637 A | * | 11/1997 | Chapman et al. | ............ 362/228 |
| 5,803,579 A | * | 9/1998 | Turnbull et al. | ............ 362/231 |
| 5,933,089 A | * | 8/1999 | Katada | ......................... 349/68 |
| 6,213,615 B1 | * | 4/2001 | Siitari | .......................... 349/68 |
| 6,447,132 B1 | * | 9/2002 | Harter, Jr. | .................... 362/29 |
| 6,488,385 B2 | * | 12/2002 | Reithmeier | .................. 362/31 |
| 6,508,576 B2 | * | 1/2003 | Emmelmann et al. | ...... 362/228 |
| 6,539,656 B2 | * | 4/2003 | Maas et al. | ................... 40/546 |

FOREIGN PATENT DOCUMENTS

| | | | |
|---|---|---|---|
| DE | 20007134 U1 | * 9/2000 | |
| EP | 1043542 A2 | 10/2000 | ............. F21S/8/00 |
| WO | WO9531672 | 11/1995 | ............. F21V/8/00 |

OTHER PUBLICATIONS

German Utility Model No. 200 07 134 U1, Published Sep. 21, 2000, "Lighting Unit with Adjustable Chromaticity Coordinate", Translation by Ralph McElroy Translation Company, pp. 1–6.*

Derwent Abstract 2000–588568, Aug. 17, 2000, PatentTreuhand–Ges Elektrische Gluehlam, English Abstract.*

* cited by examiner

Primary Examiner—Alan Cariaso

(57) ABSTRACT

A back lighting system for illuminating a display device comprises a light-emitting panel (1) and a light source (6) for coupling light into the light-emitting panel. The light source comprises a low-pressure discharge lamp (6; 7). The light source additionally comprises a plurality of LEDs (8, 8', ...; 9, 9', ...) for selectively setting the color temperature of the light emitted by the light source. Preferably, the LEDs increase the color temperature of the light emitted by the light source. Preferably, the light emitted by the back lighting system ranges from 6,000 to 10,500 K. Preferably, the LEDs are blue light emitting LEDs, each preferably having a luminous flux of at least 5 lm. The color point of an image to be displayed on a display screen of the display device is set by the back lighting system, thus enabling an optimum contrast to be achieved for the image to be displayed by the display device.

19 Claims, 2 Drawing Sheets

ILLUMINATION SYSTEM AND DISPLAY DEVICE

BACKGROUND OF THE INVENTION

This invention relates to an illumination system for illuminating a display device, comprising a light-emitting panel and a light source for coupling light into the light-emitting panel, said light source including a low-pressure mercury-vapor discharge lamp.

The invention also relates to a display device comprising said illumination system.

Such illumination systems are known per se and are also referred to as edge lighting systems. They are applied, inter alia, as back lighting for (image) display devices, for example for television receivers and monitors. Such illumination systems can particularly suitably be used as back lighting for non-emissive displays, such as liquid crystal display devices, also referred to as LCD panels, which are employed in (portable) computers or (cordless) telephones.

Said display devices generally comprise a substrate provided with a regular pattern of picture elements (pixels), which are each controlled by at least one electrode. In order to reproduce an image or a datagraphic display in a relevant area of a (display) screen of the (image) display device, the display device employs a control circuit. In a LCD device, the light originating from the backlight is modulated by means of a switch or a modulator, and various types of liquid crystal effects are employed. In addition, the display may be based on electrophoretic or electromechanical effects.

In the illumination systems mentioned in the opening paragraph, a tubular low-pressure mercury-vapor discharge lamp, for example one or more cold cathode fluorescent lamps (CCFL), is used as the light source, the light emitted, in operation, by the light source being coupled into the light-emitting panel which serves as an optical waveguide. This optical waveguide generally forms a comparatively thin, flat panel which is made of, for example, a synthetic resin or glass, with light being transported through the optical waveguide under the influence of (total) internal reflection.

An illumination system of the type mentioned in the opening paragraph is disclosed in EP 749 550. In said document, a description is given of a flat light source provided with a low-pressure mercury-vapor discharge lamp for illuminating a LCD device comprising a light-emitting panel having a light-emission window, which panel is provided with a light input edge surface for coupling light into the light-emitting panel, and the illumination system comprises a light-mixing chamber whose longitudinal direction is parallel to said light input edge surface and provided with a low-pressure mercury-vapor discharge lamp, said light-mixing chamber being associated with the light input edge surface.

A drawback of the known illumination system is that the light source has a fixed electromagnetic spectrum.

SUMMARY OF THE INVENTION

It is an object of the invention to completely or partly obviate said drawback.

In accordance with the invention, this object is achieved in that the light source further comprises a plurality of light-emitting diodes for selectively setting the color temperature of the light emitted by the light source.

By employing, in the illumination system in accordance with the invention, one or more light-emitting diodes (LEDs) having a light emission wavelength that is higher or lower than that of the low-pressure mercury-vapor discharge lamp, it is achieved that the color temperature of the light emitted by the light source can be adjusted. The color point of the light emitted by the light source in the illumination system is influenced by switching the LEDs on or off or by regulating the intensity of the LEDs with respect to the low-pressure mercury-vapor discharge lamp. By virtue thereof, the electromagnetic spectrum of the light emitted, in operation, by the illumination system can be adjusted. As a result, the color point of an image to be displayed by the display device can be adjusted without regulating the transmission factors of the pixels of the display device. In other words, the change of the color point of an image displayed by the display device is controlled by the illumination system, not by the display device. By suitably disconnecting the functions of the illumination system and the display device in the assembly, inter alia an increase of the contrast of the image displayed by the display device is obtained. As controlling the color point of the image displayed by the display device is left substantially to the illumination system, the transmission factors of the pixels of the display device can be optimally used to display a high-contrast image. The use of LEDs in combination with one or more low-pressure mercury-vapor discharge lamp yields dynamic illumination possibilities.

An embodiment of the illumination system is characterized in that the light-emitting diodes produce a light emission wavelength for selectively increasing the color temperature of the light emitted by the light source.

A low-pressure mercury-vapor discharge lamp used as a light source in the known illumination system generally has a fixed color temperature of approximately 6500 K. The addition of LEDs to the light source of the illumination system enables the electromagnetic spectrum of the light emitted by the illumination system to be adjusted. In this manner, the color temperature of the light incident on the display device can be increased.

Preferably, in addition to the low-pressure mercury-vapor discharge lamp, LEDs are used as the light source of a type which enable the color temperature of the light emitted by the illumination system to be adjusted in a range from, for example, 6,000 to 11,000 K.

A lower limit of the color temperature of the light emitted by the illumination system of 6,000 K is prompted by the fact that the color temperature of the low-pressure mercury-vapor discharge lamp lies in that range (generally about 6500 K). An upper limit of the color temperature of the light emitted by the illumination system of 11,000 K is prompted by the fact that the color filters in the display device often have a color temperature-reducing effect, causing the color temperature of the combination of illumination system and display device to be reduced to, for example, 9500 K.

In order to increase the color temperature of the light emitted by the illumination system from, for example, 6500 K (color temperature of the low-pressure mercury-vapor discharge lamp) to, for example, 9300 K, the contribution of red to the light spectrum would have to decrease to 0.90 while, simultaneously, the contribution of blue to the light spectrum would have to increase to 1.38 relative to the spectral light distribution at 6500 K, said numbers being based on the assumption that the contribution of green remains unchanged. However, if the contribution of both green and red to the light spectrum remains unchanged, and only the contribution of blue increases to 1.51 relative to the spectral light distribution at 6500 K, a so-termed correlated color temperature is achieved. The correlated color point has the following coordinates x=0.,286 and y=0.292 that are close to the 9300 K point on the black body locus, i.e. x=0.285 and y=0.294. The additional luminance resulting from the addition of 51% blue to the spectral light distribution is more than 6%, while an adaptation of also the red contribution leads to an increase in luminance of approximately 2%.

The color temperature of the light emitted by the illumination system is preferably increased in that the light-emitting diodes comprise predominantly a blue light emission wavelength.

The amount of light emitted by the LEDs is set by varying the luminous flux of the light-emitting diodes. In general, this regulating of the luminous flux takes place in a very energy-efficient manner. For example, LEDs can be dimmed without an appreciable loss of light output. Preferably, the intensity of the light emitted by the low-pressure mercury-vapor discharge lamp and the light-emitting diodes is variable in response to the illumination level of an image to be displayed by the display device. Preferably, the color point of an image displayed by the display device is determined by the illumination system. By virtue thereof, an optimum contrast of the image to be displayed by the display device is achieved.

Preferably, each one of the light-emitting diodes has a luminous flux of at least 5 lm. LEDs having such a high output are also referred to as LED power packages. The use of these high-efficiency, high-output LEDs has the specific advantage that the number of LEDs necessary for a desired, comparatively high luminous output can be relatively small. This has a favorable effect on the compactness and the efficiency of the illumination system to be manufactured.

An embodiment of the illumination system is characterized in that the illumination system comprises control electronics for changing the luminous flux of the light-emitting diodes. Suitable control electronics enables the desired color temperature effects to be achieved. In a particularly suitable embodiment the control electronics can be influenced by the user of the assembly, by a sensor that, for example, measures the color temperature of the ambient light, by a video card of, for example, a (personal) computer and/or by control software of a computer program.

These and other aspects of the invention will be apparent from and elucidated with reference to the embodiment(s) described hereinafter.

DESCRIPTION OF THE PREFERRED EMBODIMENTS

Figure 1:
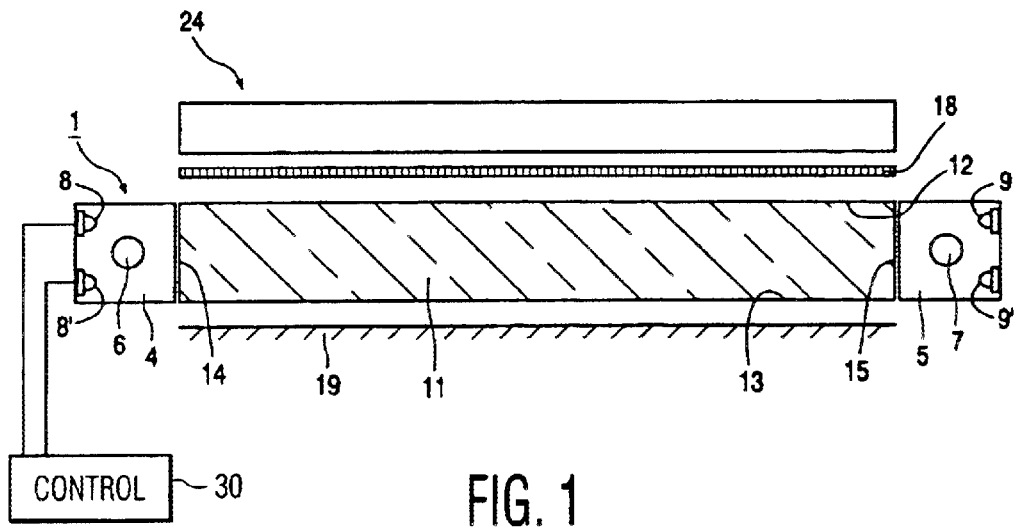
FIG. 1 is a cross-sectional view of an example of a display device in accordance with the invention.

The Figures are purely diagrammatic and are not drawn to scale. Particularly for clarity, some dimensions are exaggerated strongly. Where possible, like reference numerals refer to like parts in the drawings.

FIG. 1 is a very diagrammatic cross-sectional view of an example of a display device in accordance with the invention. The illumination system 1 comprises a light-emitting panel 11 of a light-transmitting material that is made of, for example, a synthetic resin, acryl, polycarbonate, PMMA, such as perspex, or of glass. Under the influence of total internal reflection, light is transported, in operation, through the panel 11. Said panel 11 has a front wall 12 and an opposite rear wall 13. Between the front wall 12 and the rear wall 13, light-transmitting edge surfaces 14, 15 for coupling light into the light-emitting panel 11 are situated on either side of the light-emitting panel. In the example of FIG. 1, the illumination system is provided with two light-mixing chambers 4; 5, which are provided with a light source. In an alternative embodiment, a light-transmitting edge surface is situated only on one side of the light-emitting panel, and the illumination system comprises only one light-mixing chamber.

In accordance with the measure of the invention, the light source comprises a low-pressure mercury-vapor discharge lamp 6; 7, such as a cold cathode fluorescent lamp (CCFL), in combination with a plurality of light-emitting diodes (LEDs) 8, 8', . . . ; 9, 9') . . . The LEDs 8, 8', . . . ; 9, 9', . . . used are preferably LEDs which each have a luminous flux of at least 5 lm. LEDs having such a high output are alternatively referred to as LED power packages. Examples of power LEDs are LEDs of the "Barracuda"-type (Lumileds). The luminous flux per LED is 5 lm for blue LEDs. In an alternative embodiment, power LEDs are used of the "Prometheus"-type (Lumileds), where the luminous flux per LED is 8 lm for blue LEDs.

Preferably, the LEDs are mounted on a (metal-core) printed circuit board. If power LEDs are provided on such a (metal-core) printed circuit board (PCB), the heat generated by the LEDs can be readily dissipated by heat conduction via the PCB. In an embodiment of the illumination system which is also interesting, the (metal-core) printed circuit board is in contact with the housing of the display device via a heat-conducting connection.

In operation, light originating from the light source is incident on the light-transmitting edge surfaces 14; 15 and spreads in the panel 11. In accordance with the principle of total internal reflection, the light continually travels back and forth in the panel 11, unless the light is coupled out of the panel 11, for example, by a deformation that has been provided.

Output means (not shown in FIG. 1) for coupling light out of the light-emitting panel 11 are preferably provided on a surface of the rear wall 13 of the light-emitting panel 11. These output means serve as a secondary light source. In addition, a specific optical system may be associated with this secondary light source, which optical system is provided, for example, on the front wall 12 (not shown in FIG. 1). The optical system may be used, for example, to generate a broad light beam.

The output means consist of (patterns of) deformations and comprise, for example, screen printed dots, wedges and/or ridges. The output means are provided in the rear wall 13 of the panel 11 by means of, for example, etching, scribing or sandblasting. In an alternative embodiment, the deformations are provided in the front wall 12 of the panel 11. The light is coupled out of the illumination system in the direction of the display device by means of reflection, scattering and/or refraction.

FIG. 1 optionally shows a (polarizing) diffuser 18 and a reflector or reflective diffuser 19, which bring about further mixing of the light originating from the light-emitting panel 11.

FIG. 1 also very diagrammatically shows an example of a LCD display device comprising a liquid crystal display (LCD) device 24.

Preferably, one of the light-transmitting edge surfaces 14; 15 is provided with a sensor (not shown in FIG. 1) for measuring the optical properties of the light emitted, in operation, by the light source. This sensor is coupled to control electronics 30 for suitably adapting the luminous fluxes through the light source, preferably the luminous fluxes through the LEDs 8, 8', . . . . By means of said sensor and the control electronics, a feedback mechanism can be formed for influencing the quality and quantity of the light coupled out of the panel 11.

The assembly of the illumination system, comprising the light-emitting panel 11, the light-mixing chamber 4; 5 provided with the low-pressure mercury-vapor discharge lamp 6; 7 and the LEDs 8, 8', . . . ; 9, 9', . . . , and the display device comprising the LCD panel 24 in a housing (not shown in FIG. 1) is employed particularly to display (video) images or datagraphic information.

The light originating from the LEDs can be added in different ways to the light originating from the low-pressure mercury-vapor discharge lamp. In FIGS. 2 and 3, two examples are shown.

Figure 2A:
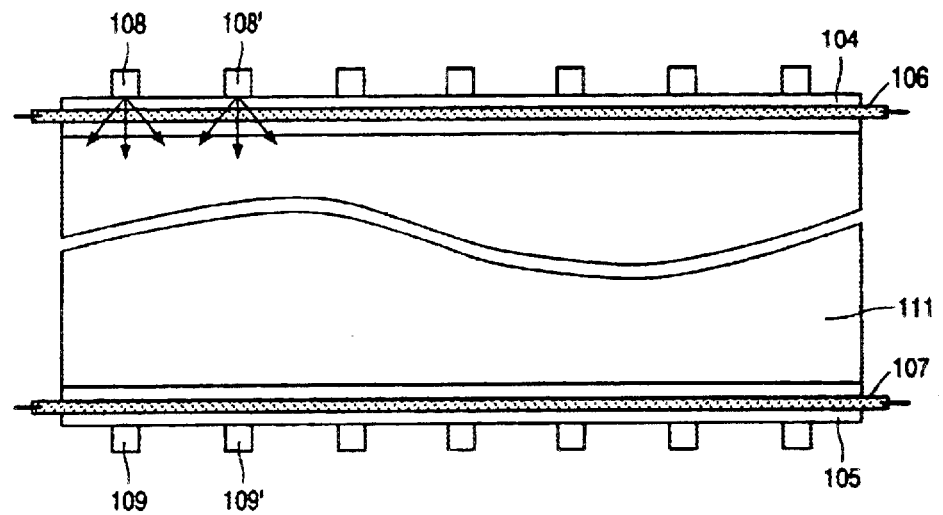
FIG. 2A is a cross-sectional view of an example of an illumination system in accordance with the invention.
Figure 2B:
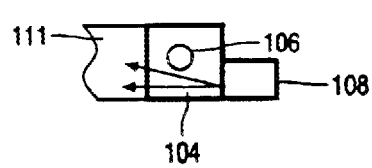
FIG. 2B is a side view of a detail of the illumination system shown in FIG. 2A.

FIG. 2A is a very diagrammatic, cross-sectional view of an example of an illumination system comprising a light-emitting panel 111 provided with two light-mixing chambers 104; 105, which are each provided with a low-pressure mercury-vapor discharge lamp 106; 107 and a plurality of LEDs 108, 108', . . . ; 109, 109', . . . , said LEDs contacting the light-mixing chambers 104; 105 on the outside, as is diagrammatically shown in the side view of the illumination system of FIG. 2B. The direction of the light emitted by the LEDs 108, 108', . . . ; 109, 109', . . . is diagrammatically indicated in FIG. 2A by means of arrows.

Figure 3A:
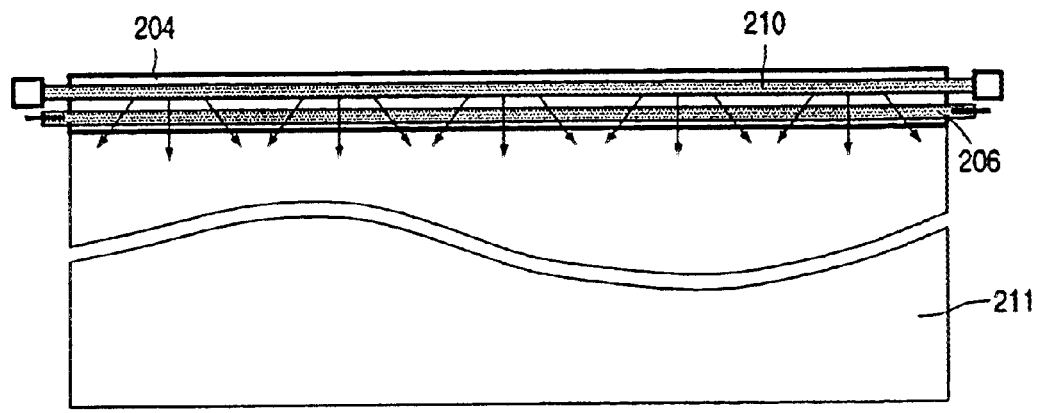
FIG. 3A is a cross-sectional view of an alternative example of an illumination system in accordance with the invention.

FIG. 3A is a very diagrammatic, cross-sectional view of an alternative example of an illumination system comprising a light-emitting panel 211 which, in this example, is provided with one light-mixing chamber 204 provided with a low-pressure mercury-vapor discharge lamp 206 and a micro-grooved bar 210 into which light is coupled by LEDs. The low-pressure mercury-vapor discharge lamp 206 and the micro-grooved bar 210 are accommodated in the light-mixing chamber 204, as diagrammatically shown in the side view of the illumination system of FIG. 3B. The direction of the light emitted by the micro-grooved bar 210 is diagrammatically indicated by means of arrows in FIG. 3A.

Figure 3B:
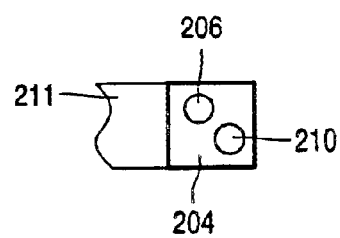
FIG. 3B is a side view of a detail of the illumination system shown in FIG. 3A.
Figure 3C:
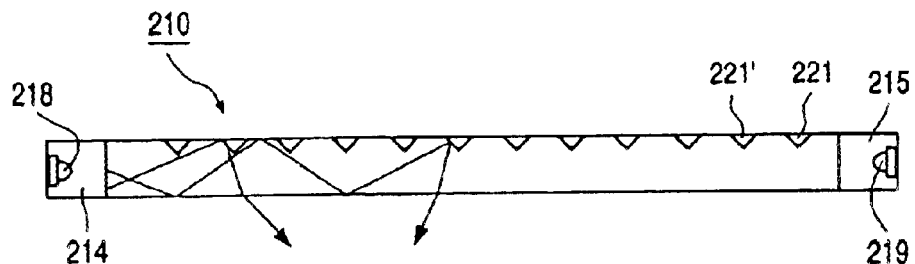
FIG. 3C is a cross-sectional view of a further detail of FIG. 3A.

FIG. 3C is a diagrammatic, cross-sectional view of the micro-grooved bar 210 as shown in FIG. 3A, said micro-grooved bar comprising two light-mixing chambers 214; 215 provided with LEDs 218; 219 which couple light into the bar 210 that is provided with light output members in the form of microgrooves 221, 221', . . . The direction of the light transported in and emitted by the micro-grooved bar 210 is diagrammatically indicated in FIG. 3C by means of arrows. The micro-grooved bar 210 is preferably made of transparent acrylate, as a result of which light originating from the low-pressure mercury-vapor discharge lamp is not absorbed. The scattering effect of the blue light originating from the LEDs will lead to a further improvement of the uniformity of the light distribution by virtue of the phosphor in the low-pressure mercury-vapor discharge lamp. The coupling of light into the optical waveguide 211 can be improved by suitably providing the microgrooves.

The advantage of the construction of the illumination system shown in FIGS. 3A–3C over the construction shown in FIGS. 2A–2B resides in that it is not necessary to form holes in the light-mixing chamber accommodating the low-pressure mercury-vapor discharge lamp. A further advantage resides in that the light emitted by the LEDs is first converted in the illumination system, as shown in FIGS. 3A–3C, from a collection of punctiform light sources to a linear light source.

It will be clear that, within the scope of the invention, many variations are possible to those skilled in the art.

The scope of protection of the invention is not limited to the examples described hereinabove. The invention is embodied in each novel characteristic and each combination of characteristics. Reference numerals in the claims do not limit the scope of protection thereof. The verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, comprising: a light-emitting panel and a light source for coupling light into the light-emitting panel, said light source including a low-pressure mercury-vapor discharge lamp having, in normal operation, a fixed electromagnetic spectrum, characterized in that the light source further comprises a plurality of light-emitting diodes, and means for selectively controlling, in operation, the color temperature of the light emitted by the light source.

2. An illumination system as claimed in claim 1, characterized in that one or more of the light-emitting diodes produce a light emission wavelength for selectively increasing the color temperature of the light emitted by the light source.

3. An illumination system as claimed in claim 2, characterized in that the color temperature of the light emitted by the light source can be set so as to range from 6,000 K to 11,000 K.

4. An illumination system as claimed in claim 1, characterized in that the light-emitting diodes produce a predominantly blue light emission wavelength.

5. An illumination system as claimed in claim 1, characterized in that each one of the light-emitting diodes and the low-pressure discharge lamp directly transmit their light, without substantial reflection to the light-emitting panel.

6. An illumination system as claimed in claim 1, characterized in that the controlling means comprises control electronics for changing the luminous flux of only the light-emitting diodes.

7. A display device comprising: a liquid crystal display device optically coupled to an illumination system as claimed in claim 1.

8. An illumination system for illuminating a display device, comprising:
a light-emitting panel, and
a light source arranged to couple light from the light source into the light-emitting panel, wherein the light source comprises;
at least one electric discharge lamp having, in normal operation, a fixed electromagnetic spectrum, and
at least one light emitting diode chosen so as to adjust the color temperature of the light emitted by the light source such that the color point of an image displayed by the display device is adjusted independently of the display device illuminated by the light source.

9. An illumination system for illuminating a display device, comprising:
   a light-emitting panel, and
   a light source arranged to couple light from the light source into the light-emitting panel, wherein the light source comprises;
   at least one electric discharge lamp, and
   at least one light emitting diode chosen so as to set the color temperature of the light emitted by the light source, wherein said at least one light emitting diode has a light emission wavelength relative to the light emission wavelength of the electric discharge lamp so as to set the color temperature of the light emitted by the light source to a level above that of the discharge lamp alone.

10. The illumination system as claimed in claim 8 wherein the at least one electric discharge lamp includes first and second electric discharge lamps physically separated from one another by the light-emitting panel.

11. The illumination system as claimed in claim 8 wherein the at least one light emitting diode provides light at a predominantly blue light emission wavelength.

12. The illumination system as claimed in claim 8 further comprising control electronics for selectively setting the luminous flux of the at least one light emitting diode under control of a user of the illumination system.

13. The illumination system as claimed in claim 8 wherein the at least one electric discharge lamp comprises first and second low pressure mercury vapor discharge lamps located at opposite sides of the light emitting panel and the at least one light emitting diode comprises at least first and second light emitting diodes also located at opposite sides of the light emitting panel.

14. The illumination system as claimed in claim 8 further comprising control electronics for selectively adjusting, during normal operation of the illumination system, the luminous flux of the at least one light emitting diode dependent upon the illumination level of an image displayed by the display device.

15. The illumination system as claimed in claim 1 wherein the controlling means controls at least one of the light emitting diodes so as to adjust the color temperature of the light emitted by the light source to a color temperature different from that of the discharge lamp alone.

16. The illumination system as claimed in claim 8 wherein the light emitting panel includes a light-mixing chamber housing the at least one electric discharge lamp and a micro-grooved bar into which light from the at least one light emitting diode is coupled and in turn emitted by the micro-grooved bar into the light emitting panel.

17. The illumination system as claimed in claim 8 wherein the at least one electric discharge lamp includes first and second electric discharge lamps and the at least one light emitting diode comprises at least first and second light emitting diodes, and
   the light emitting panel includes first and second light-mixing chambers housing the first and second electric discharge lamps, respectively, and
   the first and second light emitting diodes contact the first and second light-mixing chambers, respectively, so as to project their light into the light-emitting panel.

18. The illumination system as claimed in claim 8 wherein the at least one electric discharge lamp includes only one single low pressure mercury vapor discharge lamp.

19. The illumination system as claimed in claim 8 further comprising control electronics for selectively adjusting the luminous flux of the at least one light emitting diode as determined by ambient light.

* * * * *